Dec. 3, 1963 R. E. SMITH 3,113,012
GLASS-WORKING APPARATUS
Filed May 11, 1960 2 Sheets-Sheet 1

INVENTOR.
ROY E. SMITH
BY
Clarence R. Patty Jr.
ATTORNEY

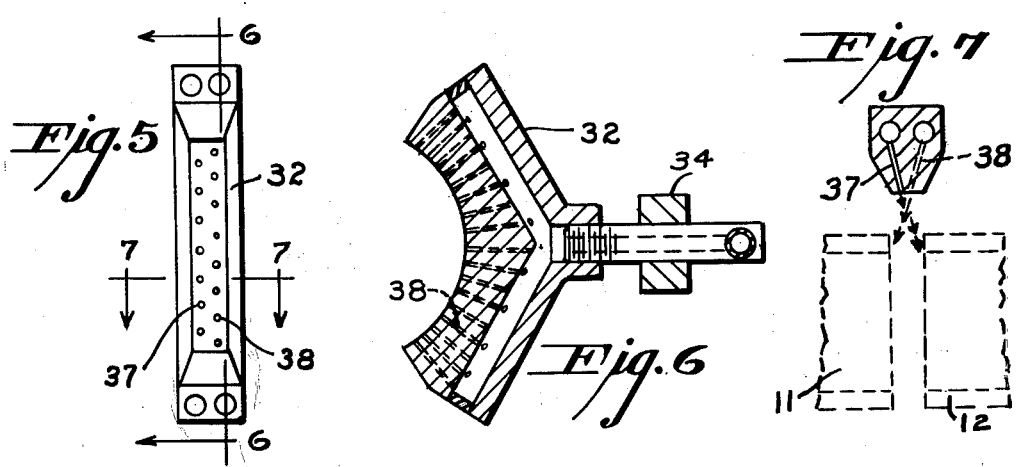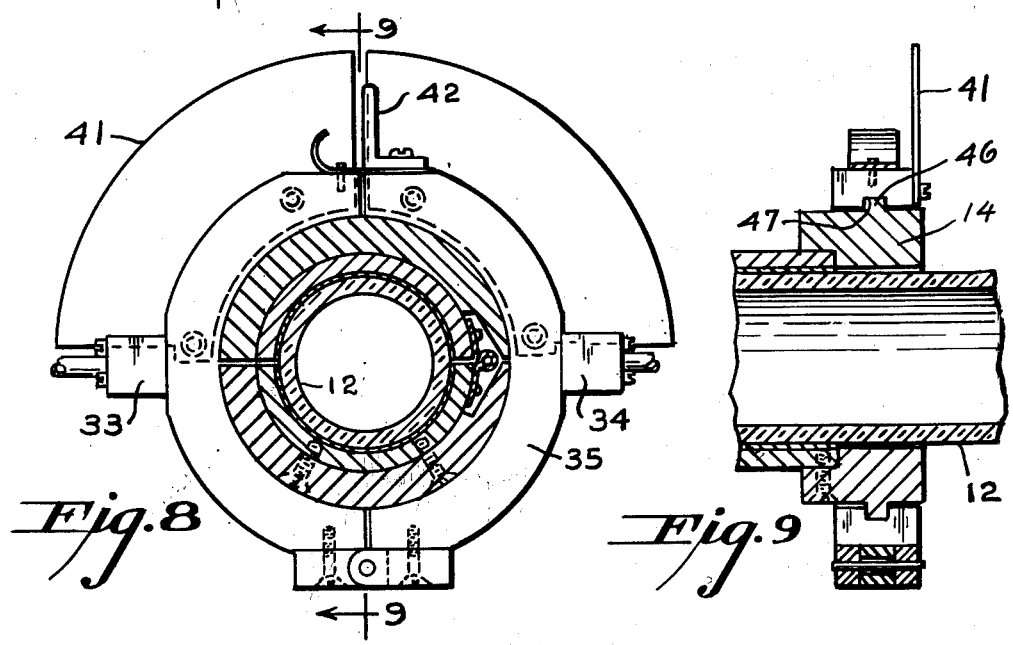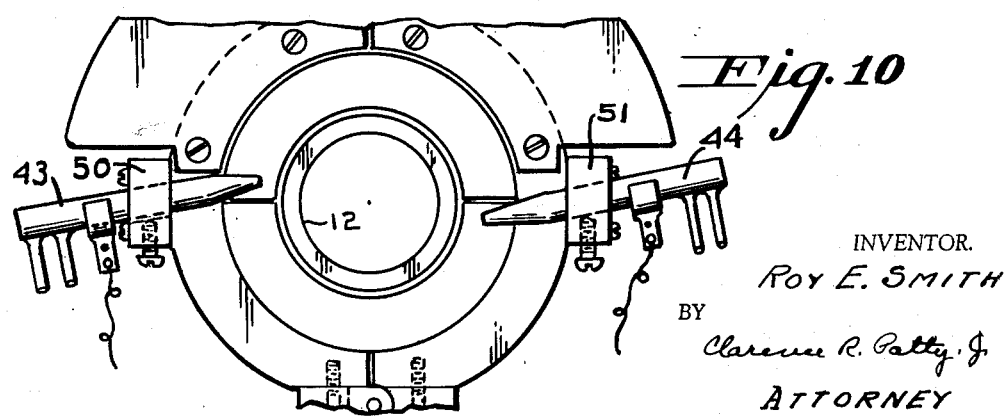

United States Patent Office 3,113,012
Patented Dec. 3, 1963

3,113,012
GLASS-WORKING APPARATUS
Roy E. Smith, Horseheads, N.Y., assignor to Corning Glass Works, Corning, N.Y., a corporation of New York
Filed May 11, 1960, Ser. No. 28,332
2 Claims. (Cl. 65—152)

The present invention relates to glass-working apparatus and more particularly to means for working and joining sections of glass pipe.

It is an object of the present invention to enable one person unassisted conveniently to join two sections of glass pipe by fusion to form a single piece by means of an apparatus which can be made to operate on the pipes while they are held relatively rigidly in what are to be their final positions in the pipe system.

A further object is to provide a means for utilizing interchangeably in the same apparatus either electrical heating or heating by means of a gas-oxygen burner as circumstances may require.

A still further object is to provide an apparatus for use in rounding off or beading the ends of a single section of glass pipe.

According to the invention, an apparatus is provided which is capable of holding in adjustable opposition two sections of glass pipe which are to be fused, while at the same time supporting rotatably means for heating the opposed edges of the sections.

Figure 1:
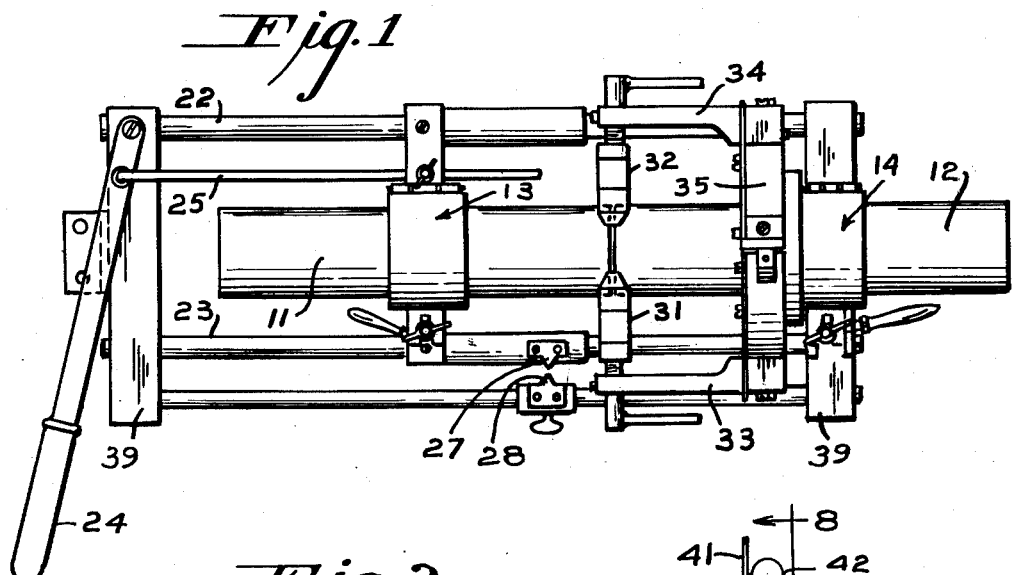
Figure 2:
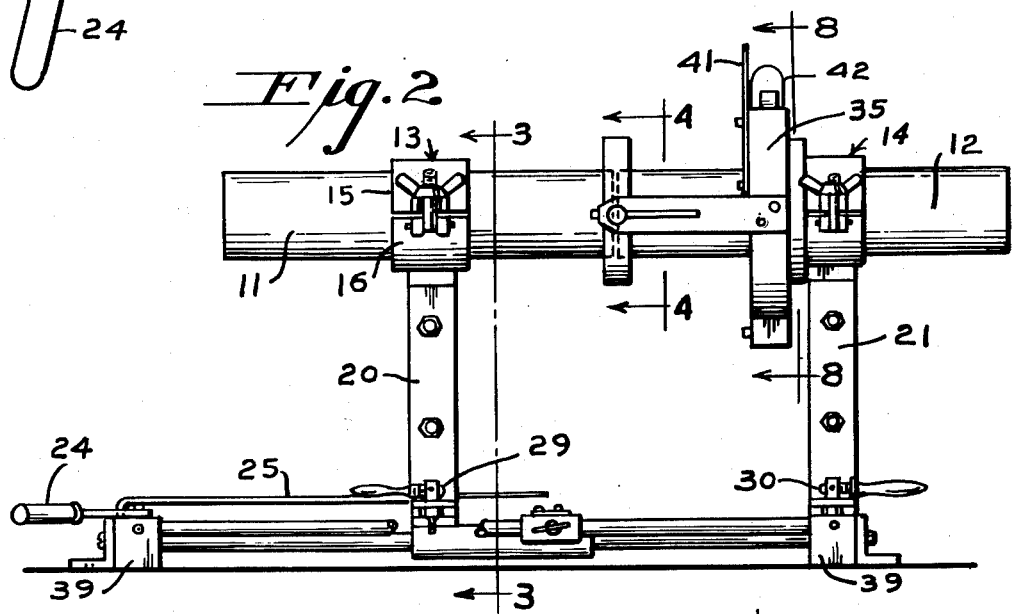
Figure 3:
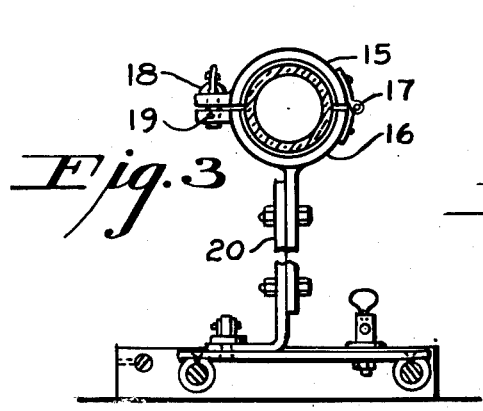
Figure 4:
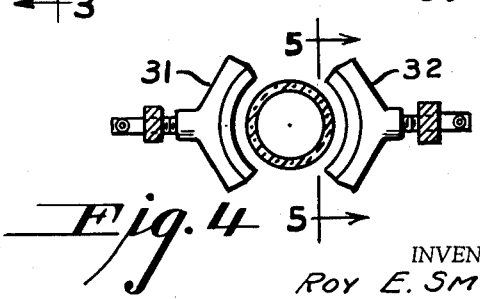

Details of the structure and functions of the present invention are illustrated in the accompanying drawings, wherein:

FIG. 1 is a top view of an apparatus for fusing two sections of glass pipe including therein the sections of pipe to be joined and utilizing a gas-oxygen burner as the heating means, FIG. 2 is a side elevation of the apparatus of FIG. 1, FIG. 3 is a view taken on line 3—3 of FIG. 2, FIG. 4 is a view of the gas-oxygen burner taken on line 4—4 of FIG. 2, FIG. 5 is an enlarged view taken substantially on line 5—5 of FIG. 4, FIG. 6 is a sectional view taken on line 6—6 of FIG. 5, FIG. 7 is a sectional view taken on line 7—7 of FIG. 5, FIG. 8 is an enlarged sectional view of a clamp and the rotatable housing taken on line 8—8 of FIG. 2, FIG. 9 is a sectional view taken on line 9—9 of FIG. 8, and FIG. 10 is a partial end view of a clamp and the rotatable housing showing the gas-oxygen burner replaced by an electrode burner.

In FIGS. 1 and 2, two sections of glass pipe 11 and 12 are shown held by clamps 13 and 14 respectively. The construction of clamp 13 is illustrated in FIG. 3, showing ring sections 15 and 16 joined by hinge 17 and held in a closed position by wing nut 18, which threads upon a shaft movable about pin 19.

Clamps 13 and 14 are mounted on supports 20 and 21. Support 20 is in turn mounted so as to permit it to be moved along rods 22 and 23 of base 39 by the motion of handle 24 transmitted through rod 25 connecting handle 24 and movable support 20. Pipe section 11 can thus be moved toward or away from pipe section 12 by manipulation of handle 24. The distance of separation can be measured by use of movable markers 27 and 28 when vision is obstructed by the burner flame.

Pipe sections 11 and 12 are placed in axial alignment by sliding at least one of supports 20 and 21 through grooves in the bases of said supports in a direction transverse to the axis of said pipe sections and securing them by the action of cam locks 29 and 30.

Gas-oxygen burners 31 and 32 are mounted on burner arms 33 and 34 connected to rotatable housing 35 in FIG. 8, which housing is in turn mounted on clamp 14 by means of a circular tongue 46 and groove 47, shown in sectional view in FIG. 9, situated so as to prevent axial movement of the housing relative to the clamp. Such circular tongue and groove connection permits rotation of the burner assembly in relation to the clamp 14. Rotation through an arc of 180° is effected by manual rotation of tab 42 formed on rotatable housing 35. The hand of the operator is protected from the burner flame by shield 41.

FIGS. 5, 6 and 7 show in detail the construction of gas-oxygen burner 32 of FIG. 1. Gas escaping from channels such as 37 and 38 is ignited, and the resultant flame impinges on pipe sections 11 and 12 as illustrated in FIG. 7.

It is well known that glass will conduct an electric current when heated. Accordingly, in a second embodiment of the present invention, the gas-oxygen burners and burner arms are replaced by electrode burners 43 and 44 and insulating burner arms 50 and 51 illustrated in FIG. 10. In operation, the glass along the edges of each piece of pipe to be joined is preheated by the burner flame to a temperature high enough to permit passage therethrough of an electric current. Thereafter, electricity flows through the heated glass between the two electrode burners, current passing through the flame from one electrode to the heated glass and then therethrough to the second electrode burner. In order to prevent arcing of the electrical discharge from one electrode burner directly to the other without passing through the glass, said burners are mounted in the plane of the joint and in substantially opposite parallel direction but not in the same straight line. This arrangement is illustrated in FIG. 10.

The apparatus comprising the present invention is thus operable by one man, who places in the apparatus the sections of pipe to be joined, presets the transverse adjustments by means of cam locks 29 and 30, sets markers 27 and 28 to indicate the distance of separation of the sections, lights the burners and then proceeds to rotate the burners with one hand by means of tab 42 while controlling the distance between the pipe sections by means of handle 24 with his other hand.

Clamp 14, support 21 and rotatable housing 35 with its attached burner may be removed from the apparatus and utilized for heating the end of a single section of glass pipe to produce a rounded end, or bead, or for cutting a section of pipe into two pieces.

What is claimed is:

1. Apparatus for working a section of glass pipe comprising two semicircular elements hinged together and closable to form a circular clamp about said pipe section, a housing comprising two semicircular elements hinged together and closable about said clamp, tongue and groove means for mounting said housing concentrically about said clamp in fixed longitudinal relation thereto but rotatable relative thereto, means for rotating said housing, and means rigidly connected to said housing for supplying heat to said section of glass pipe about a circumferential line when said housing is rotated.

2. Apparatus according to claim 1 which includes a second clamp similar to the first said clamp for holding a second section of glass pipe, a common base supporting said clamps in axial alignment, said clamps being hinged at corresponding locations to permit a section of pipe to be laterally inserted in both clamps simultaneously, and means for moving one of said clamps relative to said base in an axial direction.

(References on following page)

References Cited in the file of this patent

UNITED STATES PATENTS

| | | |
|---|---|---|
| 1,329,640 | Snavely | Feb. 3, 1920 |
| 1,591,175 | Mailey et al. | July 6, 1926 |
| 1,832,039 | Millar | Nov. 17, 1931 |
| 1,897,488 | Millar | Feb. 14, 1933 |
| 2,306,054 | Guyer | Dec. 22, 1942 |
| 2,364,673 | Stuckert et al. | Dec. 12, 1944 |
| 2,452,652 | Hansen | Nov. 2, 1948 |
| 2,947,113 | Nazzewski | Aug. 2, 1960 |

FOREIGN PATENTS

| | | |
|---|---|---|
| 212,695 | Australia | Jan. 23, 1958 |